Patented Aug. 18, 1953

2,649,425

UNITED STATES PATENT OFFICE 2,649,425

ADHESIVE CONTAINING A BUTADIENE STYRENE COPOLYMER

George E. Hulse, Wilmington, Del., assignor to Hercules Powder Company, Wilmington, Del., a corporation of Delaware No Drawing. Application November 24, 1948, Serial No. 61,932

16 Claims. (Cl. 260—27)

This invention relates, in general, to a pressure-sensitive adhesive composition and to an article coated therewith.

In the preparation of an adhesive composition such as, for example, a pressure-sensitive adhesive composition used for coating, lamination and the like, it is obviously highly desirable to prepare a composition which is convenient in use and application and which provides a maximum of adhesive strength. Valuable pressure-sensitive adhesives have been prepared from polymers of organic compounds containing vinyl groups, the composition having a resin or the like as a tackifying agent. An increased degree of conversion to the polymeric material and an increase in polymer size have been found to contribute to a greater degree of adhesive strength, with the result that it is desirable to prepare a highly converted, high-polymer composition for this purpose. Physical characteristics of the polymer composition which accompany a high degree of conversion and large polymer size are chiefly evident in an increase in viscosity of the polymer composition, and, accordingly, polymers of this type, in general, become increasingly valuable with an increasing viscosity up to a Mooney viscosity of about 120, whereupon the polymer composition usually becomes a gel and is undesirable for adhesive purposes.

Now in accordance with the present invention, a pressure-sensitive adhesive is prepared from a high viscosity solvent-soluble butadiene-styrene copolymer characterized by having a butadiene-styrene ratio between about 30:70 and about 95:5 and preferably between about 60:40 and 80:20 with an optimum ratio between about 70:30 and about 75:25, in any range the polymer having a Mooney viscosity greater than about 145. The copolymer having these characteristics is blended with a tackifying agent such as, for example, rosin or rosin derivatives including rosin esters, amines, amides, modified rosins, and the like in organic solvent solution, aqueous emulsion, or similar form, and the pressure-sensitive adhesive composition thus prepared may be applied to a desired surface by means of coating, dipping, brushing, rolling, spraying, or the like, either in a liquid vehicle or, if desired, in absence thereof.

The copolymer utilized as a basis for the adhesive composition according to this invention may be prepared by any convenient and satisfactory means which will yield a substantially completely solvent-soluble copolymer having a Mooney viscosity of at least about 145. However, since most polymerization procedures yield gels when a Mooney viscosity greater than about 120 is reached, there is recommended the typical and satisfactory procedure for the preparation of such a copolymer based on the following general formula which has yielded ultra-high viscosity polymers of excellent properties:

| Ingredients | Parts |
| --- | --- |
| Monomers | 100 |
| Water | 150 |
| Methanol | 50 |
| $\alpha,\alpha$-Dialkylaryl Hydroperoxide (catalyst) | 0.2 |
| Tertiary Mercaptan [1] (modifier) | 0.2 |
| Hydrorosin soap | 5.0 |
| Activator (Ferrous pyrophosphate, or the like) | 1.0 |

[1] E. g., a tertiary mercaptan blend composed of $C_{12}$, $C_{14}$ and $C_{16}$ tertiary mercaptans in the ratio of 3:1:1.

The activator for the polymerization reaction is preferably prepared shortly prior to its addition to the reaction medium. Thus, when potassium pyrophosphate was utilized to prepare the ferrous pyrophosphate activator, 12 parts of potassium pyrophosphate ($K_2P_4O_7$) was dissolved in 300 parts of water and to the resulting solution then was added dropwise in an inert atmosphere and with vigorous agitation a solution of 14.4 parts of ferrous sulfate heptahydrate ($FeSO_4 \cdot 7H_2O$) in 93 parts of water. The activator so prepared was stored under nitrogen and placed in an ice chest at 0° C. until utilized.

When sodium pyrophosphate was used to prepare the activator, 32 parts of sodium pyrophosphate decahydrate ($Na_4P_2O_7 \cdot 10H_2O$) was dissolved in 1400 parts of water, and to the resulting solution then was added dropwise in an inert atmosphere and with vigorous agitation 200 parts of a solution of 144 parts of ferrous sulfate heptahydrate in 1000 parts of water. At the end of the addition the resulting suspension was centrifuged under an inert atmosphere until the ferrous pyrophosphate separated out, the clear supernatant liquid then being decanted and the ferrous pyrophosphate then bein resuspended in a sufficient amount of fresh water so that 10 parts of the activator suspension was equivalent in iron content to 0.36 part of $FeSO_4 \cdot 7H_2O$. This activator was stored at room temperature under an atmosphere of nitrogen and cooled to 0° C. just prior to using.

The hydrorosin soap which was employed as an emulsifier was prepared by first dissolving 4.51 parts of hydrogenated rosin in 46.2 parts of methanol in the glass reaction vessel in which the polymerization reaction was ultimately effected, and then adding to this methanol solution of hydrogenated rosin the chemically equivalent amount of .5 N aqueous potassium hydroxide. The potassium hydroxide solution was followed by the balance of the 150 parts of water specified in the above recipe with the exception of about 10 parts which were reserved for the activator solution. Thus, the emulsifier was obtained in the desired concentration in suspension in a portion of the water-methanol antifreeze medium. The hydrogenated rosin employed was prepared by the hydrogenation of N wood rosin in the presence of a palladium-on-charcoal catalyst. The product so obtained was 98.6% saturated, was characterized by an acid number of 164 and contained 0.8% dehydroabietic acid.

After the emulsifying agent had been prepared, the $\alpha,\alpha$-dialkylaryl hydroperoxide catalyst was dissolved in the balance (3.8 parts) of the methanol and the resultant solution charged to the reaction vessel. The monomers and modifier were mixed and added to the reaction vessel and the air contained therein was swept out with nitrogen. After the air had been removed therefrom, the pressure within the reaction vessel was then adjusted to 30 p. s. i. with nitrogen, cooled to a temperature of 0° C., and the pressure again adjusted to 30 p. s. i. with nitrogen. The vessel was then agitated at a temperature of −15° C. for one hour. Ten parts of the previously described activator which had been prepared using potassium pyrophosphate and cooled to a temperature of about 0° was then added and the pressure within the reaction vessel was once more adjusted to 30 p. s. i. with nitrogen. This activator contained the balance of the water specified in the above recipe. After the activator was added, the reaction vessel was again agitated at a temperature of −15° C. for the duration of the reaction period. The reaction period was then continued until the desired high viscosity polymer composition was obtained, generally for a period of about 15 to about 50 hours, yielding a highly viscous, substantially completely solvent-soluble copolymer.

In determining the viscosity of the copolymer composition prepared according to this invention and in correlating the effectiveness of the copolymers in comparison with the viscosity thereof, it has been found desirable to supplement the measurement of Mooney viscosity with other measurements for indication of viscosity and molecular weight of the polymer. This is necessitated because copolymers having a viscosity greater than about 140 to about 150 yield erratic results with the Mooney viscometer, since this range of about 140 to 150 is substantially the upper limit of accuracy of the apparatus and method, and, thus, the significance of Mooney viscosities greater than about 140 is inexact in its differentiation. In order to supplement the data represented by Mooney viscosity, the intrinsic viscosity of the copolymers was determined from the viscosity of various relatively low concentrations of benzene solutions of the polymers (Ubbelohde dilution viscosity) followed by plotting the specific viscosity divided by concentration against the concentration of the solution and then extrapolating to zero concentration to obtain the intrinsic viscosity and, in general, preferred polymers for this invention are those solvent-soluble polymers having an intrinsic viscosity of at least 2.0. A further check and correlation of polymer viscosity was likewise made with Brookfield viscosity tests on the adhesive composition prepared from the polymer.

EXAMPLE 1

A series of butadiene-styrene copolymers was prepared in a ratio of 72 parts butadiene and 28 parts styrene according to the general formula and procedure outlined hereinbefore. The procedure was utilized to prepare copolymers of varying percentage conversion and of varying high viscosity.

In order to test the adhesive properties of the series of copolymers, there was prepared a blend of a 50% benzene solution of a pentaerythritol ester of rosin and a 10% benzene solution of the copolymer, the two solutions being blended in a 1:1 weight ratio. The viscosities of the resulting blended solutions were determined (Brookfield viscosity, 77° F.). The thus prepared solutions were brushed on standard sized canvas duck strips in a series of coats, allowing 30 minutes drying time between coats. After applying a sufficient number of coats of the adhesive solution, the test strips were dried for 24 hours and then bonded under a pressure of 1780 pounds per square inch and aged for 24 hours at 77° F. and 50% relative humidity. Strip adhesive strengths of the bonded specimens were determined at a strip rate of 2 inches per minute.

The results of these tests as set forth in Table I in comparison with control tests applied to natural rubber and to GR-S polymers indicate that high adhesive strength is attained with a high-viscosity butadiene-styrene copolymer having a high conversion ratio.

Table I

Strip Adhesive Strength of 72 Butadiene—28 Styrene Copolymers

| Parts Mercaptan | Reaction Time at −15° C. | Percent Conversion | Mooney Viscosity of Copolymer | Intrinsic Viscosity of Copolymer | Brookfield Viscosity of Solution (poises) | Strip Adhesive Strength | |
|---|---|---|---|---|---|---|---|
| | | | | | | 6 Coats | 4 Coats |
| Control: Natural rubber smoked sheets | | | | | 11.5 | 3.0 | |
| Control: GR-S Polymer | | | | | 5.0 | 8.4 | |
| 0.05 | 16.5 | 46 | 131 | | 18.5 | 17.6 | |
| 0.0 | 16.8 | 38 | 157 | | 45.0 | 23.3 | |
| 0.0 | 19.0 | 46 | 152+ | 3.1 | 132.0 | 37.2 | |
| 0.15 | 21.0 | 58 | 95 | 2.3 | 17.5 | 18.0 | |
| 0.10 | 21.0 | 57 | 136 | 2.5 | 33.0 | 24.0 | |
| 0.05 | 21.0 | 56 | 160 | 3.0 | 65.0 | 24.1 | |
| 0.05 | 21.0 | 55 | 160 | 2.9 | 59.5 | 25.2 | |
| 0.03 | 22.8 | 64 | 49 | 1.7 | 5.0 | 8.0 | |
| 0.20 | 22.8 | 64 | 71 | 1.8 | 9.5 | 13.1 | |
| 0.20 | 22.5 | 67 | 112 | | 15.5 | 17.0 | 29.0 |
| 0.10 | 22.5 | 65 | 150 | | 32.0 | 20.0 | 34.0 |
| 0.05 | 22.5 | 62 | 170 | | 47.5 | 25.3 | |
| 0.40 | 41.0 | 89 | 80 | 2.4 | 13.0 | 22.0 | 31.0 |
| 0.30 | 41.0 | 89 | 113 | 2.7 | 22.0 | 25.0 | 29.0 |
| 0.20 | 41.0 | 90 | 142 | 3.1 | 60.0 | 31.0 | 35.0 |

EXAMPLE 2

The procedure of Example 1 was repeated utilizing copolymer compositions of varied proportions of butadiene and styrene. Varying ratios of the copolymer ingredients were tested in organic solvent solution, as set forth in Table II, indicating a maximum adhesive strength at the 72:28 butadiene-styrene ratio, with a preferred range of about 60:40 to about 80:20.

*Table II*

*Effect of Butadiene-Styrene Ratio on Adhesive Strength*

| Butadiene: Styrene Ratio | Parts Mercaptan | Reaction Time at −15° C. | Percent Conversion | Mooney Viscosity | Brookfield Viscosity of Cement (poises) | Strip Adhesive Strength (4 Coats) |
|---|---|---|---|---|---|---|
| 100:0 | 0.2 | 40.5 | 69 | 119+ | 67.5 | 6.5 |
| 100:0 | 0 | 40.5 | 65 | 43+ | >1,000 | 1.8 |
| 86:14 | 0.3 | 40.0 | 75 | 105 | 35.0 | 8.0 |
| 86:14 | 0.2 | 40.5 | 81 | 132 | 27.1 | 5.6 |
| 72:28 | 0 | 22.5 | 51 | 150+ | 28.0 | 23.9 |
| 72:28 | 0 | 40.5 | 81 | 149+ | 129.6 | 19.7 |
| 60:40 | 0.2 | 23 | 72 | 81 | 5.2 | 19.2 |
| 60:40 | 0.1 | 40 | 91 | 157 | 130.8 | 18.7 |
| 60:40 | 0 | 40 | 78 | 149+ | 624 | 18.3 |
| 50:50 | 0.2 | 23 | 83 | 92 | 4.7 | 17.3 |
| 50:50 | 0.1 | 22.5 | 75 | 155 | 25.6 | 17.0 |
| 50:50 | 0 | 22.5 | 63 | 150+ | 164.7 | 14.3 |
| 40:60 | 0.2 | 23 | 92 | 103 | 5.4 | 15.3 |
| 40:60 | 0.1 | 22.5 | 89 | 140 | 25.5 | 18.1 |
| 40:60 | 0 | 22.5 | 79 | 140+ | 180.0 | 8.6 |
| GR-S Control | | | | | 5.0 | 5.5 |

EXAMPLE 3

Emulsion cements were prepared from copolymers of Examples 1 and 2 by blending a resin emulsion of a methyl ester of hydrogenated rosin and the copolymer latex at a 1:1 ratio of resin to copolymer and adjusting the resulting emulsion to the desired percentage total solids. Similar emulsions were prepared using an aqueous ammonia dispersion of a pale rosin as the blending resin. The emulsion cements thus prepared were applied by brushing to the fresh side of the leather strips in three coats and allowing to dry 30 minutes between coats. The samples were conditioned and tested as in the previous example, with adhesive strengths as set forth in Table III.

emulsifying agent utilized in the emulsion polymerization of butadiene and styrene for the preparation of high-viscosity solvent-soluble polymer is a salt of a hydrogenated rosin acid such as, for example, an alkali metal salt of hydrogenated rosin. Suitable hydrogenated rosin acid compositions may be prepared by hydrogenation of rosin, abietic acid, l-pimaric acid, d-pimaric acid, or the like. Preferably the rosin or resin acid composition is hydrogenated, for example, through treatment with hydrogen in the presence of a suitable catalyst to form a hydrorosin acid which is at least 40%, and, preferably, at least 50% saturated, with optimum results being obtained with a rosin acid which is about 90% to 100% saturated. If desired, there may be used a mixture of hydrorosin acids and fatty acids such as, for example, may be obtained by hydrogenation of tall oil or other mixture of rosin and fatty acids. In any event, the hydrorosin acids are utilized in the form of their soaps, preferably sodium or potassium soaps or the like which may be prepared by substantially complete neutralization of the hydrorosin acid composition with the appropriate

*Table III*

Butadiene-Styrene Copolymer Latices in Resin-Rubber Emulsion Cements

| Butadiene:Styrene Ratio | Parts Mercaptan | Reaction Time (Hrs. at −15° C.) | Percent Conversion | Mooney Viscosity Before Stripping | Mooney Viscosity After Stripping | Percent Solids in Latex | Resin | Strip Adhesive Strength |
|---|---|---|---|---|---|---|---|---|
| 72-28 | 0.20 | 22 | 58.2 | 44 | 52 | 31.5 | Hydrogenated Rosin Methyl Ester. | 1.0 |
| 72-28 | 0.30 | 41 | 82.5 | 70 | 73 | 32.6 | do | 1.0 |
| 72-28 | 0.20 | 41 | 84.7 | 111 | 128 | 36.9 | do | 1.8 |
| 72-28 | 0.00 | 41 | 70.6 | 147+ | 158+ | 32.1 | do | 13.4 |
| 50-50 | 0.10 | 23 | 88.2 | 141.5+ | 138+ | 30.4 | do | 3.5 |
| 72-28 | 0.20 | 22 | 58.2 | 44 | 52 | 31.5 | Rosin | 1.9 |
| 72-28 | 0.30 | 41 | 82.5 | 70 | 73 | 32.6 | do | 2.2 |
| 72-28 | 0.20 | 41 | 84.7 | 111 | 128 | 36.9 | do | 2.7 |
| 72-28 | 0.00 | 41 | 70.6 | 147+ | 153+ | 32.1 | do | 22.8 |
| 50-50 | 0.10 | 23 | 88.2 | 141.5+ | 138+ | 30.4 | do | 11.9 |
| GR-S3 | | | | | | 39.1 | do | 7.5 |

It will be understood that the high-viscosity solvent-soluble oplymers of butadiene and styrene may be prepared by any convenient means. However, inasmuch as conventional methods for the preparation of these polymers frequently result in gels, when attempts are made to prepare polymers having a Mooney viscosity greater than about 120, certain techniques and procedures are recommended although they are not considered essential to the present invention. Thus, a fatty acid soap, a rosin soap, dehydrogenated rosin soap or the like may be employed, but according to a preferred embodiment of the invention, an alkali. Suitable polymerization results are obtained through the use of the emulsifying agent in an amount equivalent to from about 0.5% to about 5%, preferably between about 1% and about 2%, based on the weight of the total polymerization reaction mixture.

It is likewise preferred to polymerize the monomers in the presence of an activator such as, for example, an inorganic reducing agent, a reducing sugar, or the like. A preferred agent is ferrous pyrophosphate which may be prepared from an aqueous solution of ferrous sulfate heptahydrate and an aqueous solution of sodium pyrophosphate decahydrate. Alternatively, there may be utilized other inorganic activators, such as appropriate cobaltous salts and the like.

A preferred catalyst for the polymerization reaction comprises an α,α-dialkylarylmethyl hydroperoxide such as, for example, α,α-dimethylbenzyl hydroperoxide, α,α-dimethyl-p-methylbenzyl hydroperoxide, α,α-dimethyl-p-isopropylbenzyl hydroperoxide, and the like. These compounds and similar α,α-dialkylarylmethyl hydroperoxides may be prepared by oxidation of appropriate compounds such as, for example, p-cymene, cumene, diisopropylbenzene, and the like. The aryl group in the hydroperoxide compound may be derived not only from benzene, but also from other aromatic nuclei such as, for example, naphthalene, anthracene, phenanthrene, and the like, and may, if desired, be substituted with alkyl groups such as methyl, ethyl, propyl, butyl, and the like.

The amount of the hydroperoxide catalyst utilized in the polymerization reaction may be between about 0.5% and about 20%, based on the amount of solid emulsifying agent used, preferably between about 2% and about 6%. Based on the total monomers, the amount of hydroperoxide may be from about 0.001% to about 5.0%, preferably between about 0.02% and about 1.5%, and usually in the range of about 0.1% to about 0.6%.

In order to prepare the desired solvent-soluble butadiene-styrene copolymer having a Mooney viscosity greater than about 150, it is presently preferred to carry out the polymerization reaction at a low temperature, less than about 20°, for example, between about −30° C. and about 20° C., and preferably at a temperature below about 10° C. Inasmuch as the polymerization thus is frequently carried out at a temperature below the freezing point of the aqueous polymerization medium, it is frequently desirable to incorporate in the aqueous medium an antifreeze composition such as, for example, a water-soluble organic compound of low freezing point. Thus, where the polymerization is to be carried out at a temperature below about 0° C., there may be utilized water solutions of lower alkanols, such as, for example, methanol, ethanol, propanol, and the like, as well as polyfunctional alcohols such as glycerin, glycols, and the like. Alternatively, if desired, nonalcoholic antifreeze compositions may be employed such as, for example, ketones, esters, and the like including acetone, methyl acetate, and other similar compounds. In any event, those skilled in the art will be able to select or formulate a reaction medium, the freezing point of which is below the temperature at which the desired polymerization reaction is effected.

It has also been found that desirable copolymer compositions may include modifying agents such as frequently are incorporated in the preparation of synthetic rubbers. For example, a small amount of organic mercaptans such as, preferably, tertiary mercaptans having a carbon chain of about 12 to 20 carbon atoms, may be incorporated in the polymerization mixture with advantage, frequently affording a greater degree of control of viscosity of the copolymer.

The proportions of monomer ingredients utilized in the preparation of the copolymer have been found to influence greatly the adhesive strength of the final pressure-sensitive adhesive composition. Thus, it has been found that desired proportions of the monomer ingredients comprise a butadiene-styrene ratio between about 30:70 and about 95:5 with a preferred ratio range between about 60:40 and about 80:20 and, for optimum results, between about 70:30 and about 75:25. An excellent butadiene-styrene ratio for the preparation of a composition having a high adhesive strength is about 72 parts butadiene and 28 parts styrene.

The copolymer composition prepared from the desired proportions of butadiene and styrene monomers according to the conditions and procedures set forth herein is formed into a pressure-sensitive adhesive by suitable blending with a tackifying agent usually in an amount between about 0.2 and about 5, based on the weight of the copolymer, and preferably between about 0.5 and about 2. This tackifying agent comprises a resinous organic compound compatible with the copolymer and including such materials as, for example, rosin and rosin derivatives including rosin esters, amines, amides, as well as modified rosin, rosin by-products, terpene polymers, indene and coumarone polymers, natural gums, pitches, oils, and the like. The desired tackifying agent is blended with the copolymer composition in aqueous or organic vehicle or in other means as may be desired, yielding a solution in which the components are molecularly dispersed or a colloidal dispersion or emulsion or the like. Thus there may be used an aqueous emulsion containing a substantial proportion of free rosin or the appropriate rosin derivative which may be blended with the copolymer composition resulting from the polymerization reaction. Alternatively, the tackifying agent and the copolymer may be dissolved in suitable organic solvent as, for example, an aromatic or aliphatic hydrocarbon or the like and the adhesive composition formed by blending these solutions together. Alternatively, if desired, the copolymer and the tackifying agent may be blended in substantial absence of solvent or dispersing medium and may subsequently be dissolved or dispersed in an appropriate vehicle. In any event, there is formed as an adhesive composition a solution or dispersion of the copolymer and the tackifying agent which may be applied to a desired surface by means of coating, dipping, brushing, spraying, or the like to yield a pressure-sensitive adhesive coated article or, if desired, by a related operation such as calender application of the composition either in liquid vehicle or in the absence of dispersing liquid or solvent. The adhesive material may be used with particular advantage with cellulosic compositions of all types including fibrous and nonfibrous articles such as paper, molded pulp products, textiles and fibrous materials from natural cellulose as well as regenerated cellulose and cellulose derivatives, nonfibrous cellulosic webs and molded articles and the like. The adhesive composition may thus be applied to a variety of materials such as cloth, leather, paper, metals, wood or other articles and, if desired, coated sheets of such materials may be pressed together to form laminated articles or for other uses as will be apparent to those skilled in the art.

What I claim and desire to protect by Letters Patent is:

1. A pressure-sensitive adhesive comprising a solvent-soluble butadiene-styrene copolymer having proportions between about 30% butadiene to about 70% styrene and about 95% butadiene to about 5% styrene and having a Mooney viscosity above 145, blended with a tackifying agent said copolymer having been prepared at a polymerization temperature of between about −30° C. and about 20° C. using an a,a-dialkylarylmethyl hydroperoxide catalyst and an inorganic reducing agent activator.

2. A pressure-sensitive adhesive comprising a solvent-soluble butadiene-styrene copolymer having proportions between about 60% butadiene to about 40% styrene and about 80% butadiene to about 20% styrene and having a Mooney viscosity above 145, blended with a tackifying agent said copolymer having been prepared at a polymerization temperature of between about −30° C. and about 20° C. using an a,a-dialkylarylmethyl hydroperoxide catalyst and an inorganic reducing agent activator.

3. A pressure-sensitive adhesive comprising a solvent-soluble butadiene-styrene copolymer having proportions between about 70% butadiene to about 30% styrene and about 75% butadiene to about 25% styrene and having a Mooney viscosity above 145, blended with a tackifying agent said copolymer having been prepared at a polymerization temperature of between about −30° C. and about 20° C. using an a,a-dialkylarylmethyl hydroperoxide catalyst and an inorganic reducing agent activator.

4. A pressure-sensitive adhesive comprising a solvent-soluble butadiene-styrene copolymer having proportions between about 70% butadiene to about 30% styrene and about 75% butadiene to about 25% styrene and having a Mooney viscosity above 145, blended with rosin said copolymer having been prepared at a polymerization temperature of between about −30° C. and about 20° C. using an a,a-dialkylarylmethyl hydroperoxide catalyst and an inorganic reducing agent activator.

5. A pressure-sensitive adhesive comprising a solvent-soluble butadiene-styrene copolymer having proportions between about 70% butadiene to about 30% styrene and about 75% butadiene to about 25% styrene and having a Mooney viscosity above 145, blended with a rosin ester said copolymer having been prepared at a polymerization temperature of between about −30° C. and about 20° C. using an a,a-dialkylarylmethyl hydroperoxide catalyst and an inorganic reducing agent activator.

6. A pressure-sensitive adhesive comprising a solvent-soluble butadiene-styrene copolymer having proportions of about 72% butadiene and about 28% styrene and having a Mooney viscosity above 145, blended with a tackifying agent said copolymer having been prepared at a polymerization temperature of between about −30° C. and about 20° C. using an a,a-dialkylarylmethyl hydroperoxide catalyst and an inorganic reducing agent activator.

7. A pressure-sensitive adhesive coating composition comprising a liquid dispersion of a solvent-soluble copolymer having proportions between about 60% butadiene to about 40% styrene and about 80% butadiene to about 20% styrene and having a Mooney viscosity above 145, blended with a tackifying agent said copolymer having been prepared at a polymerization temperature of between about −30° C. and about 20° C. using an a,a-dialkylarylmethyl hydroperoxide catalyst and an inorganic reducing agent activator.

8. A pressure-sensitive adhesive coating composition comprising a liquid dispersion of a solvent-soluble copolymer having proportions of about 72% butadiene and about 28% styrene and having a Mooney viscosity above 145, blended with a tackifying agent said copolymer having been prepared at a polymerization temperature of between about −30° C. and about 20° C. using an a,a-dialkylarylmethyl hydroperoxide catalyst and an inorganic reducing agent activator.

9. A pressure-sensitive adhesive coating composition comprising an organic solvent solution of a solvent-soluble copolymer having proportions between about 60% butadiene to about 40% styrene and about 80% butadiene to about 20% styrene and having a Mooney viscosity above 145, blended with a tackifying agent said copolymer having been prepared at a polymerization temperature of between about −30° C. and about 20° C. using an a,a-dialkylarylmethyl hydroperoxide catalyst and an inorganic reducing activator.

10. A pressure-sensitive adhesive coating composition comprising an aqueous emulsion of a solvent-soluble copolymer having proportions between about 60% butadiene to about 40% styrene and about 80% butadiene to about 20% styrene and having a Mooney viscosity above 145, blended with a tackifying agent said copolymer having been prepared at a polymerization temperature of between about −30° C. and about 20° C. using an a,a-dialkylarylmethyl hydroperoxide catalyst and an inorganic reducing agent activator.

11. A pressure-sensitive adhesive coating composition comprising a liquid dispersion of a solvent-soluble copolymer having proportions between about 70% butadiene to about 30% styrene and about 75% butadiene to about 25% styrene and having a Mooney viscosity above 145, blended with rosin said copolymer having been prepared at a polymerization temperature of between about −30° C. and about 20° C. using an a,a-dialkylarylmethyl hydroperoxide catalyst and an inorganic reducing agent activator.

12. A pressure-sensitive adhesive coating composition comprising a liquid dispersion of a solvent-soluble copolymer having proportions between about 70% butadiene to about 30% styrene and about 75% butadiene to about 25% styrene and having a Mooney viscosity above 145, blended with a rosin ester said copolymer having been prepared at a polymerization temperature of between about −30° C. and about 20° C. using an a,a-dialkylarylmethyl hydroperoxide catalyst and an inorganic reducing agent activator.

13. A pressure-sensitive adhesive coating composition comprising a liquid dispersion of a solvent-soluble copolymer having proportions between about 30% butadiene to about 70% styrene and about 95% butadiene to about 5% styrene and having a Mooney viscosity above 145, blended with a rosin ester said copolymer having been prepared at a polymerization temperature of between about −30° C. and about 20° C. using an a,a-dialkylarylmethyl hydroperoxide catalyst and an inorganic reducing agent activator.

14. A new article of manufacture comprising a base material having as a surface coating thereon a solvent-soluble copolymer having proportions between about 60% butadiene to about 40% styrene and about 80% butadiene to about 20% styrene and having a Mooney viscosity above 145 blended with a tackifying agent said copolymer having been prepared at a polymerization temperature of between about −30° C. and about 20° C. using an a,a-dialkylarylmethyl hydroperoxide catalyst and an inorganic reducing agent activator.

15. A new article of manufacture comprising a base material having as a surface coating thereon a solvent-soluble copolymer having proportions of about 72% butadiene and about 28% styrene and having a Mooney viscosity above 145, blended with a tackifying agent said copolymer having been prepared at a polymerization temperature of between about −30° C. and about 20° C. using an α,α-dialkylarylmethyl hydroperoxide catalyst and an inorganic reducing agent activator.

16. A pressure-sensitive adhesive comprising a solvent-soluble butadiene-styrene copolymer having proportions between about 30% butadiene to about 70% styrene and about 95% butadiene to about 5% styrene and having a Mooney viscosity above 145 blended with a tackifying agent, said copolymer having been prepared at a polymerization temperature of between about −30° C. and about 10° C. using an α,α-dialkylarylmethyl hydroperoxide catalyst and an inorganic reducing agent activator.

GEORGE E. HULSE.

References Cited in the file of this patent

UNITED STATES PATENTS

| Number | Name | Date |
|---|---|---|
| 2,333,403 | Youker | Nov. 2, 1943 |
| 2,457,335 | Williams et al. | Dec. 28, 1948 |
| 2,477,316 | Sparks et al. | July 26, 1949 |
| 2,526,654 | Gleason et al. | Oct. 24, 1950 |

FOREIGN PATENTS

| Number | Country | Date |
|---|---|---|
| 572,994 | Great Britain | Nov. 1, 1945 |
| 577,871 | Great Britain | June 4, 1946 |
| 123,533 | Australia | Feb. 20, 1947 |